United States Patent [19]

Weitman

[11] Patent Number: 4,742,865
[45] Date of Patent: May 10, 1988

[54] METHOD OF CONTROLLING AN ENERGY RECOVERY SYSTEM

[76] Inventor: Jacob Weitman, Tryffelst. 8, S-611 63 Nykoping, Sweden

[21] Appl. No.: 730,557

[22] Filed: May 6, 1985

[30] Foreign Application Priority Data

May 7, 1984 [EP]  European Pat. Off. ........ 84850146.6

[51] Int. Cl.⁴ ............................................. F24D 11/00
[52] U.S. Cl. ........................................ 165/18; 165/47; 165/909
[58] Field of Search ..................... 165/47 BW, 18, 909

[56] References Cited

U.S. PATENT DOCUMENTS

| | | | |
|---|---|---|---|
| 2,713,252 | 7/1955 | Jackson et al. | 165/18 |
| 3,946,802 | 3/1976 | Christenson | 165/47 BW |
| 4,207,752 | 6/1980 | Schwarz | 165/909 X |
| 4,326,551 | 4/1982 | Voohees | 165/47 BW |

FOREIGN PATENT DOCUMENTS

| | | | |
|---|---|---|---|
| 2809989 | 9/1979 | Fed. Rep. of Germany | 165/47 BW |
| 2947360 | 5/1981 | Fed. Rep. of Germany | 165/47 BW |
| 2381257 | 9/1978 | France | 165/909 |
| 1108492 | 4/1968 | United Kingdom | 165/47 BW |

*Primary Examiner*—Ira S. Lazarus
*Attorney, Agent, or Firm*—Jay H. Maioli; Lewis H. Eslinger

[57] ABSTRACT

A method is provided to control an energy recovery system to achieve an increase of the statistical average system recovery efficiency. The system includes at least one fluid accumulator tank (6, 20, 30) and at least one heat exchanger (10, 25) for waste process fluid or gas. According to the invention the flows through the primary or secondary side of the heat exchanger (10, 25) is at each time continuously controlled by a parameter being a function of both the actual temperature and the actual fluid volume in said accumulator tank (6, 20, 30).

8 Claims, 2 Drawing Sheets

METHOD OF CONTROLLING AN ENERGY RECOVERY SYSTEM

The present invention relates to a method of controlling an energy recovery system to achieve an increase of the statistical average system recovery efficiency, said system including at least one fluid accumulator tank and at least one heat exchanger for waste process fluid or gas.

In industrial heat recovery systems, the problem often arises to control fluid flows through heat exchangers, such that, under given boundary conditions (including total system configuration and accumulating capacities available) a maximum system recovery efficiency is obtained, being defined as the amount of waste heat recovered from process fluids or gases, related to the totally available waste heat amount.

In industrial systems, waste heat may be recovered from process fluids and gases and transferred to other fluids, often water, this latter fluid being consumed in processes and/or used as a circulating heat carrier to transfer heat to other processes and for space heating. In industries having this type of recovery system, e.g. the textile industry, the laundry industry, the food industry, etc., great variations occur over time in the amounts and temperatures of the waste heat emitting process fluids and gases, as well as in the momentary demand for new process fluid and/or recovered heat.

An object of the invention is to provide an improved automatic method to control an energy recovery system, such that the system recovery efficiency as defined above is maximized.

This object is achieved by the invention in that the flows through the primary or secondary side of the heat exchanger are at each time continuously controlled by a parameter being a function of both the actual temperature and of the actual fluid volume of the fluid in said accumulator tank.

The invention will now be described more in detail, solely by way of example, with reference to FIG. 1, which shows schematically a system for the recovery of thermal energy from waste process fluids and gases.

Figure 1:
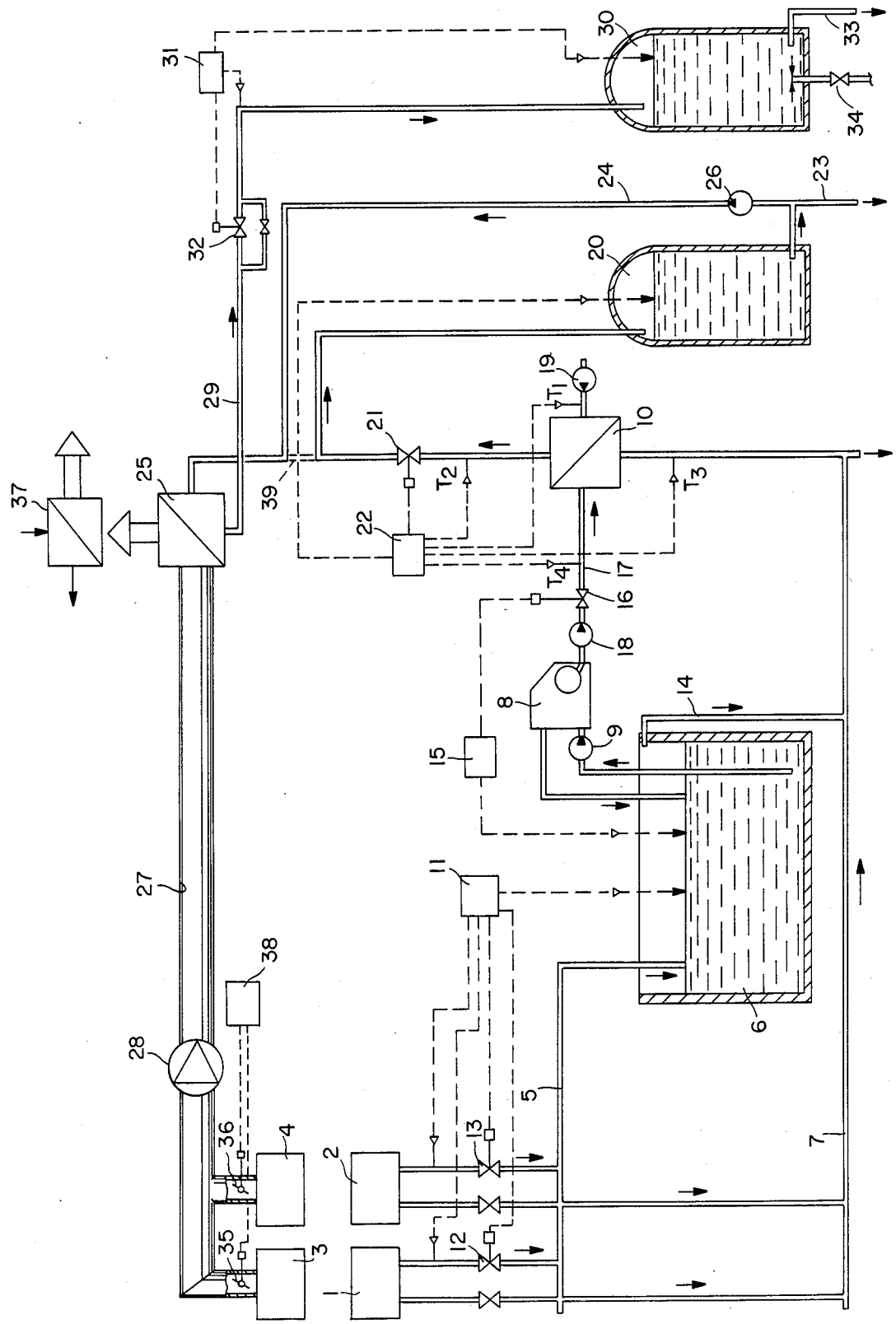
FIG. 1 is a schematic representation of a thermal energy recovery system according to the present invention.

In FIG. 1, reference numerals 1 and 2 designate machines in a first group of waste process fluid emitting machines in an industry, e.g., a textile industry, a laundry industry, a food industry, etc., which machines emit waste process fluids of different and varying temperatures, said process waste fluids being emitted either continuously or discontinuously (batchwise). Reference numerals 3 and 4 designate machines in a second group of waste process gas emitting machines 3 and 4, which are operated either continuously or intermittently and at different and varying temperatures. Very often large variations of the enthalpy of the process gases will occur due to variations of water vapor content, such as in exhaust gases from industrial driers. Of course, the number of machines 1, 2 or 3, 4 can be varied and is not limited to the number shown in the drawing.

The waste process fluids emitted from the machines 1 and 2 are selected in such a way that at each moment only waste fluids having a temperature in excess of a reference temperature TR1 are admitted via a line 5 to a first waste process fluid collecting accumulator tank 6, whereby the reference temperature TR1 is an analytical function of *both* the temperature and the volume of the fluid already accumulated in said first accumulator tank 6. Waste fluids having temperatures below said reference-value are fed directly to a waste fluid outflow 7.

The waste fluid collected in the first accumulator tank 6 is conducted to a cleaning device 8 by means of a pump 9. The waste process fluid which has been passed through said cleaning device is fed therefrom to a first beat exchanger 10.

The selection of waste process fluids conducted to the first accumulator tank 6 from the first group of machines 1 and 2 is affected by a first control device 11. Hence, the temperature of the fluid in the first accumulator tank 6 and the volume of the fluid are measured and registered in the first control device 11 and the choice whether to open valves 12 and 13 to conduct said waste process fluid to the first accumulator tank 6 is based on these measurements. The first accumulator tank 6 has a spillway line 14, which is connected to the waste fluid outflow 7.

A second control device 15 is used to open a valve 16 on a line 17 leading from the cleaning device 8 through the primary side of the first heat exchanger 10 such that the flow through valve 16 is a function of the volume of the waste process fluid in the first accumulator tank 6. The valve 16 is fully opened when the first accumulator tank 6 is full and is closing gradually as the volume of the fluid in the first accumulator tank 6 is decreasing, such that the valve is fully closed at zero fluid level.

Figure 2:
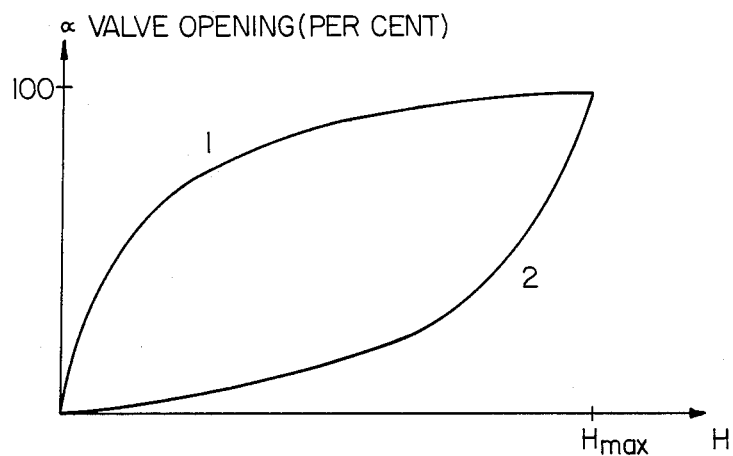
FIG. 2 is a graph of the regulation of the valve versus size of the tank in the system of FIG. 1.

FIG. 2 shows the regulation of the valve 16 as a function of the size of the accumulator tank 6. Curve 1 is the regulation of the tank 6 if its size is small and curve 2 if the size of the tank 6 is large, where $H$ = the fluid level (percent of maximum level) in the first accumulator tank 6

$H_{max}$ = the maximum level $a$ = valve opening (percent)

The waste process fluid from the cleaning device 8 is conducted through the primary side of said first heat exchanger 10 and further to the waste fluid outflow 7. A cooling fluid is conducted through the secondary side of said heat exchanger 10 by means of a pump 19 to a second accumulator tank 20. On the line between the first heat exchanger 10 and the second accumulator tank 20 a valve 21 is provided, which is controlled by a third control device 22, said valve 21 being controlled with regard to a parameter being a function of *both* the flow rate through the primary side of the heat exchanger 10 and of the fluid volume in the second accumulator tank 20. By doing so, the first heat exchanger 10 is used optimally with respect to the volumes in the first and the second accumulator tanks 6 and 20, respectively, and also with respect to the heat transfer surface available in said heat exchanger.

The fluid in the second accumulator tank 20 is thereafter conducted to consumers. These consumers can of course be the group of machines 1 and 2 from which the waste process fluids are emitted or other machines requiring process fluids.

The waste process gas flows admitted to the second heat exchanger 25 are selected by a control device 38 via dampers 35 and 36 such that at each moment only waste gas flows having a temperature in excess of a reference temperature TR2 are admitted to the second heat exchanger 25, whereby the reference temperature TR2 is an analytical function of both the temperature of the fluid already accumulated in the second accumulator tank 20 and the volume and/or the temperature of the fluid already accumulated in a third accumulator tank 30.

The waste process gas leaving the second heat exchanger 25 may be led to a third heat exchanger 37 to heat another fluid, such as fresh water. Also, the waste process gas not admitted to the second heat exchanger 25 may be merged with the gas cooled in the heat exchanger 25 before entering the third heat exchanger 37.

The fluid in the second accumulator tank 20 will also, in many cases, be led, via a pipeline 24, through the second heat exchanger 25 by means of a pump 26. Through the primary side of the second heat exchanger 25 waste process gas emitted from the second group of machines 3 and 4 is conducted via a duct 27 by means of a fan 28. The fluid passing through the secondary side of said heat exchanger 25 is conducted via a pipeline 29 to said third accumulator tank 30. The flow of fluid from the second accumulator tank 20 to the third accumulator tank 30 is controlled by means of a fifth control device 31, adapted to operate on a valve 32, such that the flow is determined by a parameter TR3 being a function of both the volume of the fluid already accumulated in the third accumulator tank 30 and a reference temperature level set between the temperatures of the gas flow to the secondary side of said second heat exchanger 25 and of the feed fluid flow to the primary side of said heat exchanger.

Through a pipeline 33 fluid is led from the accumulator tank 30 to consumers. In cases when a constant temperature is required on the line 33 steam or auxilliary heat may be added by a valve 34.

In the following some detailed aspects of the control principles will be explained.

DYNAMIC SELECTION PRINCIPLE

When recovering heat from the waste process fluids from the first group of machines 1 and 2 hitherto normally a static selection criterium has been used, such that cold outlets have been led directly to the waste fluid outflow, while hot outlets have been led to the first accumulator tank, to be transported further to the heat exchanger 10.

The expressions "hot" and "cold" have hitherto been used in a thermostatic sense, such that outlets colder than a constant selecting temperature of about 40°-50° C., have been conducted directly to the waste fluid outflow 7. This is reasonable if the momentary situation is such that the first accumulator 6 is totally filled with fluid of, e.g., 60° C., whereby, when a fluid of a temperature lower than 60° C. is supplied to said accumulator tank, energy is lost by conducting hotter fluid via the spillway 14 to said cold discharge line 7.

On the other hand, if the first accumulator tank 6 is only partly filled with fluid of, e.g., 60° C., or is totally filled with fluid of, e.g., 35° C. due to heat losses (the temperature often decreases in the accumulator tank some degrees below the selecting temperature), it is a loss to conduct a fluid which does not fulfill the above described selecting criteria to said outflow.

It is therefore intuitively clear that the thermostatic selecting principles should be replaced by an improved method. In U.S. Pat. Ser. No. 3,946,802 it is stated that the selecting should be performed such that "the temperature in the heat exchanger" is considered. It is not clear what is really meant by this, since there is no uniquely defined temperature in a heat exchanger, but if we assume that the expression "the temperature in the heat exchanger" refers to the inlet temperature of the waste fluid to the heat exchanger, this temperature will be equal to the temperature in the accumulator tank 6. Hot outlets are then such outlets which are at least as hot as the temporary contents in the accumulator tank 6. If now the accumulator tank 6 at a certain occasion contains a small amount of waste fluid of, e.g., 60° C., even a great amount of waste fluid of 58° C. will automatically be selected away and sent to said outflow 7, since this fluid is "colder than the temperature in the heat exchanger". Practical attempts to use the selecting principle according to the above-mentioned U.S. Pat. No. 3,946,802 based on the expression "the temperature in the heat exchanger", have also shown that great losses occur.

From the description above it can be seen that neither a constant thermostatic selecting temperature nor a variable selecting temperature according to the above-mentioned U.S. Pat. No. 3,946,802 give optimal results, and that an improved selecting principle is desirable.

Therefore, the variable selecting temperature TR1 is introduced according to the present invention, said temperature TR1, being a function of the level H(=the volume) in the first accumulator tank, TR1=TR1(H).

It is intuitively clear that the function TR1(H) must contain parameters taking into account the statistical variations of waste fluid flow versus time as well as the real sizes of the accumulator tanks 6 and 20.

To elucidate this, we can look at a plant having a large accumulator tank 6, e.g. 100 m$^3$, compared with the average inflow per hour, which we may assume to be 10 m$^3$/h. When properly controlled, the accumulator tank 6 should be actively utilized, i.e. the accumulator tank 6 will on an average be filled to approximately 50 percent (rather than being totally filled or totally empty). Thus on an average, 50 m$^3$ of the accumulator tank volume will be available to receive temporarily large supplies of waste fluid, e.g., due to several machines being emptied simultaneously. In this case there is little risk that valuable (hot) supplies will be led to the waste fluid outflow 7 due to accumulator tank 6 being already filled, but with waste fluid having a low temperature.

In case the accumulator tank 6 is large in comparison with the average waste water flow rate per unit of time, TR1(H) may accordingly be a slowly increasing function of the level H, implying that, when the waste fluid volume in the first accumulator tank 6 is small, even rather cool waste fluid contributions will be accepted to it. In the opposite case, when the first accumulator tank 6 is small in relation to the average supply rate, TR1(H) must be a much more sensitive (faster increasing) function of H.

It can be shown that in the function $$TR1(t,H) = T1 + (T4 - T1) \cdot \left( \frac{H(t)}{H_{max}} \right)^n$$

where
t=time
$0 \leq n < \infty$ $H_{max}$ = maximum level in the first accumulator tank 6
$T1$ = temperature of the cold feed fluid supply
$T4 = T4(t)$ = instantaneous temperature in the first accumulator tank 6, and
$H = H(t)$ = instantaneous level in the first accumulator tank 6, the parameter n can be adjusted to give optimal waste fluid selection from a recovery point of view.

Figure 3:
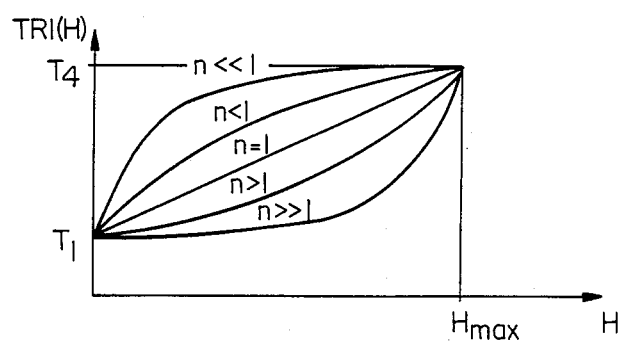
FIG. 3 is a graph of tank temperature versus fluid level.

The function TR1(H) for some different n values is shown by the diagram or graph of FIG. 3.

If $H = H_{max}$, then $TR1(H) = T4$ regardless of the value of n, which means that, when the accumulator tank is filled, only such fluids which are at least as hot as the contents of the first accumulator tank 6 are admitted to it.

If the accumulator tank is small the value of n is chosen $n < < 1$. On an average, this leads to a substantially greater reference temperature value, i.e., a greater demand upon the quality (= temperature) of the waste fluid to be accepted for recovery.

On the other hand, if the accumulator tank is large, the value of n is chosen $n > > 1$. Hereby large amounts of waste fluid at temperatures only slightly in excess of T1 will be admitted to the accumulator tank 6 before a real risk of running out of accumulating capacity occurs.

As an even more general case one may set $$TR1 = TR1(H1, H2)$$

where
 H1 = the level in the first accumulator tank 6, and
 H2 = the level in the second accumulator tank 20.

It can be seen that, when the volume of the accumulator tank 20 is large as well as the capacities of the heat exchanger 10, the cleaning device 8 and the pumps 9 and 18 are large, the energy in the waste fluid can immediately be recovered with high efficiency and transferred to clean fluid which will be stored in the second accumulator tank 20, whereby the dependence on the first accumulator tank 6 is reduced. With regard to the substantially increased costs for the capacities of the heat exchangers, the pumps and the cleaning device it is, however, normally more economic to size the first accumulator tank 6 such that its volume is equal to a few times the average flow per hour of waste water.

In summary, it is realized, as can also be shown by statistical methods, that the selecting criterium, $T0 - TR1(H) > 0$ hot waste fluid, and $T0 - TR1(H) \leq 0$ cold waste fluid where
 T0 = the temperature of the waste fluid before selection
 TR1(H) = the variable reference temperature as a function of the storing capacity of the accumulator tank 6,
in combination with a finite accumulator tank volume essentially increases the total recovery in relation to thermostatic selection with a constant reference temperature level.

CONTINUITY PRINCIPLE

The waste process fluids emitted by the machines 1 and 2 are to be cooled by heat exchanging. In order to achieve a high system efficiency several important criteria must be met:

1. The above-mentioned selection of waste process fluids must be done in such a way that the time integral of energy theoretically available for recovery, $$K \int_0^t \dot{q}_s(t) \cdot [T4(t) - T1(t)] \, dt,$$

is maximized.

In the integral $\dot{q}_s$ = the waste fluid flow rate, and the temperature $T1(t)$ = the cold feed fluid temperature, 2. The flow rates on the primary and secondary sides of the heat exchanger 10 must be in phase with each other (simultaneousness).

3. The average magnitudes of the flow rates on the primary and on the secondary sides of the heat exchanger 10 shall have a given relationship (correlation).

4. The heat exchanger 10 should be utilized as continuously as possible.

5. The heat recovered as well as the process fluids should be accumulated as efficiently as possible in order to level out the considerable load variations during a day.

Accordingly, it is not sufficient to take only criterium 1 into consideration. Rather, all the above-mentioned criteria must be taken into account if a high *system efficiency* is to be achieved. Merely the application of large and otherwise appropriate heat exchangers is not satisfactory.

To illustrate a practical situation the drawing again can be used. In this case, the cleaning device 8 and the valve 16, for the sake of simplicity, will be left out of consideration, and it is assumed that the pump 9 feeds waste fluid from the first accumulator tank 6 directly into the first heat exchanger 10. The pump 9 is equipped with a safety device (not shown) which stops the pump 9 when a predetermined low level is reached in the first accumulator tank 6.

In many practical situations the supply rate of waste fluid to the first accumulator tank 6 is varying greatly during a twenty-four hour period. So, the instantaneous value of the supply rate can be ten times the average value of the supply rate during a twenty-four hour period. The hourly mean value of the supply rate often varies by a factor of three to four times the twenty-four hour average value. In the ideal case, the flow rate on the primary side of the heat exchanger 10 should be held constant and equal to the twenty-four hour average supply rate to the accumulator tank 6 from the first group of machines 1 and 2. This would permit a uniform utilization of the heat exchanger 10. In practice, this is seldom possible due to the finite size of the first accumulator tank 6.

As an example, a case can be described when the volume of the accumulator tank 6 is 30 m³ and the average value of the flow rate to the accumulator tank 6 over a twenty-four hour period is 30 m³/h. Frequently occurring one-hour average values of the supply rate are thus 60–90 m³/h. To manage such periods with a large supply of waste fluid, avoiding an overfilling of the accumulator tank 6, which would result in losses of hot waste fluid, the pump 9 must have a capacity of 75–90 m³/h.

At times when the average supply to the accumulator tank 6 is much less than the capacity of the pump 9, the accumulator tank 6 will be quickly emptied, and hence the flow through the heat exchanger 10 ceases.

Accordingly when the pump 9 is sized to cope with situations of high supply flow rate to accumulator 6, which is customary in this type of applications, the heat exchanger 10 will be utilized in a very discontinuous way.

In the current example the heat exchanger 10 is utilized only during 33–40 percent of the total time, but with a high load of waste fluid, 75–90 m$^3$/h. As a result of this discontinuity, the recovery efficiency is lower as compared to the efficiency which would be obtained with the same heat exchanger at a constant flow rate of 30 m$^3$/h.

Even more unsatisfactory a situation will occur if the secondary flow through the heat exchanger 10 is not synchronized with the primary flow. Therefore, the pumps 9 and 19 on the primary and secondary sides of the heat exchanger 10 are started and stopped simultaneously. This simple principle is, however, not satisfactory in a system where an uninterrupted control of the primary flow is introduced to meet the requirement of continuity.

Consequently, whenever large variations in the supply flow rate to accumulator 6 occur, improved flow control methods are required on both the primary and the secondary sides of the heat exchanger 10.

In order to use the buffering effect of the accumulator tank 6, permitting a continuous operation of the heat exchanger 10 optimally, the flow through the primary side of said heat exchanger 10 is, according to the present invention, controlled such that said flow rate is allowed to increase when the level in the accumulator tank 6 is raising and to decrease when the level is sinking.

When a cleaning device is used according to the drawing, it may be suitable (see the Swedish Pat. No. 8006389-4 by Applicant) to return to the first accumulator tank 6 the fluid, which is fed to said cleaning device, but which is not transported further by pump 18 through the heat exchanger 10. Hereby, the volume capacity of the pump 9 can without disadvantage be chosen large, and the pump 9 will then work continuously as long as fluid is present in the accumulator tank 6 (the pump 9 is stopped by means of said safety device when the level in the first accumulator tank 6 is approaching zero).

When the level, i.e., the volume, in the accumulator tank 6 is increasing, this indicates that the waste fluid supply rate to said accumulator tank 6 is larger than the waste fluid outflow rate therefrom. The larger the total volume of the accumulator tank 6, the slower the increase of the waste fluid level will be and consequently the "softer" the control of the valve 16, which opens to increase the outflow rate from accumulator tank 6 until a balance is reached between supply rate and outflow rate. On the other side, if the level in the accumulator tank 6 is decreasing, this indicates that the supply rate to said accumulator tank is smaller than the outflow rate. According to the present invention, valve 16 shall in this case close until a balance is reached between supply and the outflow rates, respectively. Thus, an effective utilization of the buffer volume in the accumulator tank 6 and a continuous utilization of the heat exchanger 10 are achieved.

Now, when the flow rate from the accumulator tank 6 varies slowly and continuously with time, the simultaneousness criterium 2, requiring that the flow rate on the secondary side of the heat exchanger 10 shall have zero phase difference and a given amplitude relationship to the primary flow, cannot be satisfied by starting up and stopping the pump 19. If a rotation speed control is introduced, the rotation speed of pumps 18 and 19 might be controlled by the control device 11 at constant throttling of the valve 21. Due to the fact that the pressure losses in a system have an approximately quadratic dependence on the flow rate, such a rotation speed control of the pumps cannot provide a constant flow relation between the flow rate on the primary and on secondary sides the heat exchanger 10, which is required in order to use the heat transfer surfaces in the heat exchanger 10 as efficiently as possible.

In a known method (SE Patent Application No. 8006391-0 by Applicant) the flow rate through the heat exchanger 10 is controlled in a simple way, such that a desired constant flow ratio is maintained between the primary and secondary flow rates. In this already known method, which automatically fulfils the criteria 2 and 3 above, the flow rates need not be measured directly. Rather, the control is based on the measurement of temperatures T1, T2, T3 and T4, only. This is a great advantage since, above all, the measurement of the momentaneous flow rate at large flow rates of contaminated and possibly corrosive fluids is, from a technical point of view, both difficult and expensive.

In the known method, the control of the flow through the heat exchanger 10 is provided by means of the throttle valve 21 or, as an alternative, by controlling the rotation speed of the pump 19.

According to the present invention a further improvement is obtained by continuously varying the set or reference value of the flow ratio between the secondary and the primary flows, as a function of the level in the second accumulator tank 20, thereby, taking into consideration the remaining accumulating capacity in the accumulator tank 20. When the level in the accumulator tank 20 is high, the set value is decreased as a function of the level, thereby decreasing the flow to the second accumulator tank 20. On the other hand, when the level in the accumulator tank 20 is low, the set value is increased, thereby increasing the flow to the accumulator tank 20.

In cases when both the waste heat supply and the momentary heat demand vary strongly with time, a certain accumulation is, according to the previous discussion, required on both the primary and on the secondary side of the heat exchangers.

The size and the optimal utilization of the accumulator tanks 20 and 30 on the secondary side cannot be seen independently of the accumulating and controlling methods which are suitable on the primary side, and which have been described above.

When a heat recovery and storage system comprising several temperature levels is used, the flow to the low temperature accumulator 20 in a system with accumulation at two temperature levels, can be controlled by a flow ratio or described above. The ratio control is overridden in the cases when too low or too high a level in the accumulator tank 20 occurs. In the former case the valve 21 is forced to open (or is the pump 19 forced to run with full speed) independently of the instantaneous flow rate value. In the latter case the valve 21 is forced to close (or the pump 19 is stopped).

When the sizes of the accumulator tanks 6 and 20 are suitably chosen, in relation to the actual time variations of the flow rate of fluids to the accumulator tank 6 and of consumption flow rate variations from the accumulator tank 20, the highest and the lowest levels in the accumulator tank 20 (full tank and empty tank, respectively), will seldom be reached. Consequently it will be easier to satisfy the criteria 2, 3, and 4 above. Apparently, the set value for the ratio of the flow rates should be chosen such that the flow rate to the accumulator tank 20 is, on the average, equal to the flow rate therefrom, i.e., the long term mean value of the supply to the accumulator tank 20 is equal to the long term mean value of the output from the accumulator tank 20 without hitting the permissible maximum levels in the accumulator 20.

By utilizing the higher temperature levels of the waste heat from the machines 3, 4, the intermediately stored fluid from the accumulator tank 20 or the fluid directly from heat exchanger 10 can be postheated by the heat exchanger 25 and stored in the accumulator tank 30.

When, according to known techniques, such a postheating is provided, no other control than an on/off-control of the flow rate from the heat exchanger 25 is provided, i.e., the pump 26 is operated until the accumulator tank 30 is full, independent of the amount of the heat available in the primary flow through the heat exchanger 25. With regard to the discontinuity of the processes in the machines 3, 4, this means that the accumulator tank 30 may be filled with process fluid (most often water) of different temperatures, sometimes equal to or even lower than the temperature in the accumulator tank 20. Later, when again enough heat is present on the primary side of the heat exchanger 25 to heat the flow from the accumulator tank 20 to a high temperature, the accumulator tank 30 may already be filled with fluid, i.e., the storing capacity is fully utilized, and which prevents utilization of the more valuable later waste heat flow to the primary side of heat exchanger 25.

According to the present invention, the described system will comply with said criterium 5, for the optimal utilization of the available secondary storage capacity accumulator tanks 20 and 30 by controlling the flow rate $\dot{q}_5$ such that a desired temperature (set temperature) is obtained by variation of the flow rate through the heat exchanger 25, such that the flow rate is decreased if the actual temperature (measured with a sensor) is below the set temperature and is increased if the actual temperature is above the set temperature, the set temperature being a function of the level in the accumulator tank 30. This level is measured with a level sensor, and controls the set temperature to the control device 31.

When the level in the accumulator tank 30 is low, the set temperature is decreased, i.e., less heated fluid is accepted. The higher the level in the accumulator tank 30, the higher is the set value, i.e., the more selective becomes the valve 32 with regard to the energy which is to be stored. This is evident, since a high level in the accumulator tank 30 implies a small remaining storage capacity and accordingly demand for as high as possible energy contents in the fluid received for storage.

The above described system can be extended to apply to a system, in which the second accumulator tank 20 is omitted. In such a case the pipe line from the heat exchanger 10 is connected directly to the heat exchanger 25 as shown by the dotted lines 39. The third and fourth control devices 22 and 31 act together, and only one of the valves 21 and 32 is needed. The second accumulator tank 20 as well as the pump 26 are disposed of. When the level of the fluid in the third accumulator tank 30 is low, an increased flow rate is allowed through the heat exchangers 10 and 25. In the opposite case when the level is high, a restricted flow rate or no flow is allowed.

In this case, alteration of the set value in relation to the level in the accumulator tank 30 is extended to comprise not only the set value BT5 to the control device 31, but also the set value BK2 to the control device 22.

When the level in the accumulator tank 30 is low, the set values BK2 and BT5 are decreased, whereby a greater flow rate is allowed through the heat exchangers 10 and 25. The set value control is only overridden when the level in the third accumulator 30 is low or high (the connection between the set value BT5 and the level in the accumulator tank 30 can be chosen such that the valve 32 is totally closed when the tank is full, whereby overriding of the set value control at high level is not required).

However, it is to be noted that the last described control with the valves 21 and 32 in series is not generally applicable.

To maximize the total momentary heat power of the recovery system under given boundary conditions of mass flow rate, on-line calculation and on-line computer control are required, taking into consideration waste heat supply and quantity, demand of process fluid and heat, patterns of consumption, accumulator tank sizes and the actual characteristics of the heat exchangers (i.e. the heat transferring capacities as kW/°C. of logarithmic mean temperatures at different flow rates and temperatures on the primary and the secondary sides of the heat exchangers).

The invention is not limited to the specific embodiment shown in the drawing, but can be modified within the scope of the accompanying claims.

What is claimed is:

1. A method of controlling an energy recovering system to achieve an increase of the statistical average system recovery efficiency, the energy recovering system being of the kind having:
   a first source of a first waste process fluid;
   at least a first accumulator tank for the first waste process fluid, the heat of which is to be recovered;
   a second source of a second fluid to be heated;
   a first heat exchanger with a primary side through which the first fluid is passed and a secondary side through which the second fluid is passed;
   the method comprising the steps of controlling the input flow of said first fluid to the first accumulator tank such that at any instant the first fluid is admitted to at least the first accumulator tank only if its temperature exceeds a reference temperature derived as a predetermined analytical function of the temperature and volume of the fluid present in the first accumulator tank, and continuously controlling the flow through the primary side of the first heat exchanger in accordance with a parameter which is a second, predetermined analytical function of the volume of the fluid present in the first accumulator tank.

2. A method in accordance with claim 1, in which the energy recovering system includes a second accumulator tank and a third control device, comprising the further step of continuously controlling the flow through the secondary side of the heat exchanger in accordance with a second parameter, derived from predetermined function of the flow rate through the primary side of the heat exchanger and the volume of the second fluid already accumulated in the second accumulator tank.

3. A method in accordance with claim 2, including the step of selecting the first analytical function based on variations in the first waste process fluid flow versus time and based on the size of the first accumulator tank.

4. A method in accordance with claim 3, including the step of determining the first analytical function as:

$$TR1(t, H) = T1 + (T4 - T1) \cdot (H(t)/H\max)^n$$

where

TR1(t, H) is said reference temperature;

t = time;

T1 = temperature of the second fluid;

T4 = instantaneous temperature in the first accumulator tank;

H(t) = instantaneous level in the first accumulator tank; and $0 \leq n < \infty$.

5. A method in accordance with claim 2, including the step of selecting the first analytical function based on to the size of the first and second accumulator tanks.

6. A method in accordance with claim 5, including the step of selecting said first parameter so that the flow through the primary side of the heat exchanger increases as the level in the first tank rises and decreases as the level falls.

7. A method in accordance with claim 6, in which the energy recovering system includes a third accumulator tank and including the further steps of admitting water process gas to the primary side of the second heat exchanger only when its temperature is in excess of the reference temperature which is an analytical function of both the temperature of the fluid already accumulated in the second tank and the volume of the fluid already accumulated in the third accumulator tank.

8. The method in accordance with claim 7, comprising the further step of controlling the flow rate through the secondary side of the second heat exchanger by a parameter which is a function of both the volume of the fluid already accumulated in the third tank and a reference temperature which at any instant is between the temperature of the second waste process fluid and that of the second fluid passing through the secondary side of the second heat exchanger.

* * * * *